(12) United States Patent
Taylor et al.

(10) Patent No.: US 9,259,795 B1
(45) Date of Patent: Feb. 16, 2016

(54) TORCH FOR CUTTING OR PERFORATION

(71) Applicant: Energetic Materials and Products, Inc., Round Rock, TX (US)

(72) Inventors: Aaron M. Taylor, Pflugerville, TX (US); John J. Granier, Round Rock, TX (US); Dennis E. Wilson, Cedar Park, TX (US); Darrel R. Barnette, Austin, TX (US)

( * ) Notice: Subject to any disclaimer, the term of this patent is extended or adjusted under 35 U.S.C. 154(b) by 39 days.

(21) Appl. No.: 14/012,373

(22) Filed: Aug. 28, 2013

Related U.S. Application Data (60) Provisional application No. 61/693,950, filed on Aug. 28, 2012.

(51) Int. Cl.
*B23K 7/00* (2006.01)

(52) U.S. Cl.
CPC .................................. *B23K 7/00* (2013.01)

(58) Field of Classification Search
CPC ......................................................... F42B 3/22
USPC ........................................... 266/48; 102/288
See application file for complete search history.

(56) References Cited

U.S. PATENT DOCUMENTS

| | | | |
|---|---|---|---|
| 3,173,636 A | 3/1965 | Helms et al. | |
| 3,695,951 A | 10/1972 | Helms, Jr. et al. | |
| 3,890,174 A | 6/1975 | Helms, Jr. et al. | |
| 4,000,022 A | 12/1976 | Beckert et al. | |
| 4,298,063 A | 11/1981 | Regalbuto et al. | |
| 4,352,397 A | 10/1982 | Christopher | |
| 4,424,086 A | 1/1984 | Christopher | |
| 4,432,816 A | 2/1984 | Kennedy et al. | |
| 4,495,848 A | 1/1985 | Rozner et al. | |
| H865 H * | 1/1991 | Sery et al. | 102/306 |
| 5,372,069 A | 12/1994 | Hart et al. | |
| 6,805,832 B2 | 10/2004 | Mohler et al. | |
| 7,632,365 B1 | 12/2009 | D'Arche et al. | |
| 2013/0139715 A1* | 6/2013 | Bleicken | 102/311 |

OTHER PUBLICATIONS

Sery et al., U.S. Statutory Invention Registration No. H865, "Apparatus for attaching ordnance to barrier targets," Jan. 1, 1991.
Ernst-Christian Koch, *Metal-Fluorocarbon Based Energetic Materials*, Wiley-VCH Verlag & Co, KGaA, Weinheim, Germany, pp. 236-237, 245 (2012).
"Door breaching," *Wikipedia*, 5 pages, Jun. 2, 2013.
"Shock tube detonator," *Wikipedia*, 2 pages, Jan. 10, 2013.
"Pyronol Torch," in *Encyclopedic Dictionary of Pyrotechnics (and Related Subjects)*, PyroLabs, Inc., 1775 Blair Road, Whitewater, CO 81527, pp. 903-904 (2012).

* cited by examiner

*Primary Examiner* — Scott Kastler (57) ABSTRACT

One example of a system includes a reactive material, a nozzle, a liner, and an igniter in a breaching tool suitable for hand-held operation. The nozzle includes at least one exit aperture and is configured to direct a discharge produced by combustion of the reactive material. The liner is disposed around the reactive material and connected to the nozzle. The liner is configured to confine the discharge to the at least one exit aperture. The igniter is disposed within the liner and in contact with the reactive material.

24 Claims, 8 Drawing Sheets

TORCH FOR CUTTING OR PERFORATION

This application claims the benefit, under 35 U.S.C. §119 (e), of U.S. Provisional Patent Application No. 61/693,950, entitled "Metal Vapor Torch for Cutting and Perforation Applications," filed Aug. 28, 2012, and naming Aaron Taylor, John Granier, Dennis Wilson, and Darrel Barnett as inventors. The above-referenced application is hereby incorporated by reference herein in its entirety.

The U.S. Government has a paid-up license in this invention and the right in limited circumstances to require the patent owner to license others on reasonable terms as provided for by the terms of contract No. FA8651-11-C-0136 awarded by the U.S. Air Force.

FIELD OF THE INVENTION

The present disclosure relates in general to energetic materials and tools and methods for manufacturing and using such materials and tools. In particular, this disclosure describes construction and use of exothermic torches for the removal of metal barriers, as may be helpful for military, law enforcement, or rescue operations.

BACKGROUND

In the context of the present application, breaching is an operation of disabling a mechanical barrier such as a locked door, gate, bar, lock, or other obstacle. Breaching is sometimes performed during military, police, or emergency services operations to gain physical access to a locked facility or other location to which access has been intentionally or inadvertently obstructed. In many breaching operations, a fast completion time is helpful or essential to the success of the operation. For example, the breaching may be needed so that first responders can reach a victim who requires medical assistance as soon as possible.

Various forms of breaching operations include mechanical breaching (e.g., with lock picking, prying, battering rams, cutting tools), ballistic breaching (e.g., applying a projectile weapon to a door, hinge, or lock), explosive breaching (which can be rapid, but which introduces risk for personnel and requires some mechanical cover for personnel and bystanders). Thermal breaching is another form of this operation.

BRIEF DESCRIPTION OF THE DRAWINGS

A skilled practitioner will appreciate the benefits, features, and advantages of the present disclosure with reference to the following description and accompanying drawings. The figures are not necessarily drawn to scale.

DETAILED DESCRIPTION

The following description is presented to enable one of ordinary skill in the art to make and use the technology of the present disclosure as provided within the context of particular applications and their requirements. Various modifications to the disclosed embodiments will be apparent to one skilled in the art, and the general principles described herein may be applied to other embodiments. Therefore, this disclosure is not intended to be limited to the particular embodiments shown and described herein, but is to be accorded the widest scope consistent with the principles and novel features herein disclosed.

Thermal breaching operations have typically included the use of cutting torches applied to doors and other barriers, and have comparatively seldom been used. One reason that some thermal breaching tools have been relatively disfavored is because they have typically been comparatively slow. Another reason is that some thermal breaching tools require equipment that is relatively heavy or awkward for convenient use in emergency situations.

Figure 1:
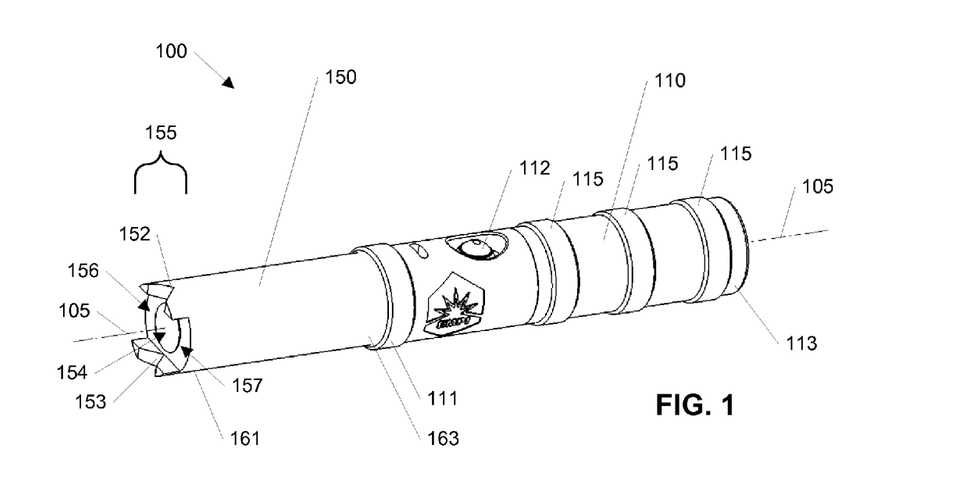
FIG. 1 shows one implementation of a breaching tool.

FIG. 1 shows one implementation of a breaching tool 100. In this example, breaching tool 100 is a hand-held device that includes an expendable cartridge 150 and a reusable handle 110 that can be detached from the cartridge. Cartridge 150 includes a charge of reactive material and an exit aperture 154 through which a high-temperature discharge is ejected. The discharge may include flame, metal vapor, plasma, solid particles emitted at high speed (e.g., approx. 1 km/s, 2 km/2, 3 km/s) and temperature (e.g., 2000 K, 2500 K, 3000 K, 3500 K), and other combustion products of the reactive material. In various implementations, the discharge is an exothermic jet that applies thermal and mechanical (abrasive/erosive) action to a target material. Handle 110 includes a firing button 112 that initiates combustion of the reactive material.

In this implementation, cartridge 150 has a largely cylindrical geometry around a body axis 105. Cartridge 150 has a firing end 161 and a mounting end 163 that is at an opposite end along body axis 105 from firing end 161. Mounting end 163 is configured to be attached to handle 110. Exit aperture 154 is disposed on an axial face of firing end 161, and is configured to eject the flame (not shown) in an outward direction substantially along body axis 105.

Firing end 161 also includes an alignment structure 155. In the illustrated example, alignment structure 155 includes four tips located at a radial distance away from exit aperture 154. The four tips extend parallel to body axis 105. The tips are shaped so that four voids are present in the spaces between adjacent tips: two vee grooves 152 and 153, and two exhaust regions 156 and 157. The spaces are arranged so that exit aperture 154 is substantially centered between vee grooves 152 and 154, and so that exit aperture 154 is substantially centered between exhaust regions 156 and 157.

Handle 110 has a substantially cylindrical geometry around body axis 105. Handle 110 has a mounting end 111, and a tail end 113 that is at an opposite end along body axis 105 from mounting end 111. Mounting end 111 of handle 110 is configured to be attached to mounting end 163 of cartridge 150. In the depicted example, handle 110 is augmented with gripping ridges 115 to aid a user in gaining a secure hold of breaching tool 100. Firing button 112 is depicted as a push-button switch on the cylindrical surface, near the middle of handle 110. In general, firing button 112 is located at a convenient location for hand-held operation.

Figure 2:
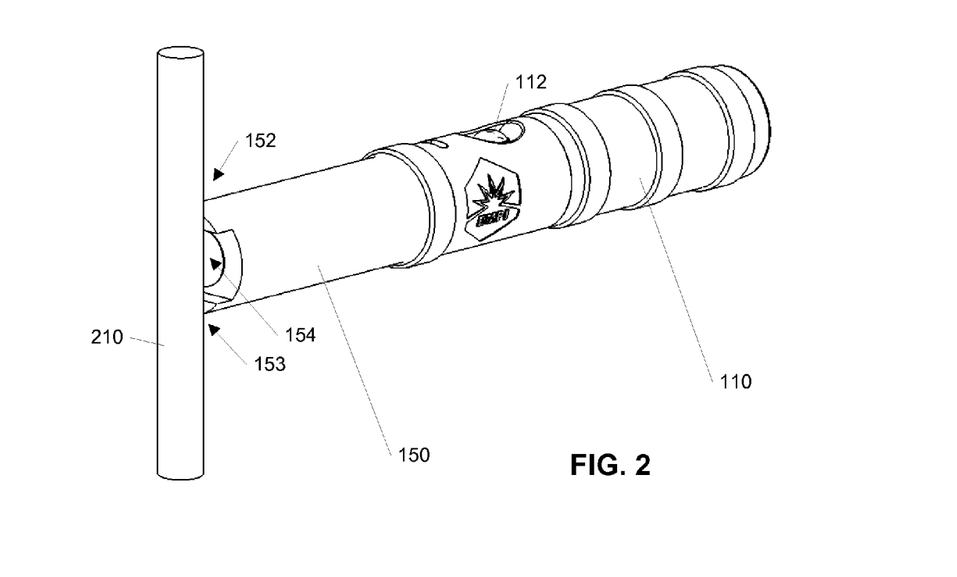
FIG. 2 illustrates an example in which a breaching tool is positioned in preparation for operation.

FIG. 2 illustrates an example in which breaching tool 100 is positioned in preparation for operation. In this example, a user carries breaching tool 100 in one hand. The two vee grooves 152 and 154 are pressed against a cylindrical metal target 210, such as a section of steel rebar. Accordingly, a portion of the target is aligned in a target axis that is defined by vee grooves 152, 153 and by the diameter of the target. This portion of the target is also centered along the body axis of the breaching tool, and is in a line of fire from exit aperture 154. With a steady grip, the user can stably maintain the breaching tool in alignment with the target. The user initiates combustion by depressing firing button 112, which causes a high-intensity and hot discharge to be emitted from exit aperture 154 onto target 210. The discharge impinges on a section of target 210, and causes the metal material in that section of the target to melt, burn, or vaporize. The discharge is sufficiently hot and intense to complete the operation in a desired amount of time, such as a breaching time of 0.2, 0.4, 0.5, 0.7, 1.0, 1.5, 2, 5, 10, 30, 60 seconds. In general, thicker targets may require longer operating times. Shorter operating times are desired in various situations, e.g., to avoid exposure of persons to unsafe prevailing conditions. With the section of target removed, the operation has effectively cut through target 210. By itself, this cut may be sufficient in various situations to breach a barrier formed by target 210. In other situations, one or more additional cuts in the target, or additional breaching efforts, may be needed to adequately breach the barrier. In such situations, the detachable handle-cartridge combination can be used to rapidly prepare the breaching tool for another cut through a target. For example, in various implementations of breaching tool 100, a user can load the expendable cartridge 150 into the reusable handle 110, arm the breaching tool, make a cut, eject the spent cartridge, load another cartridge, and make another cut within 15 seconds.

Figure 3:
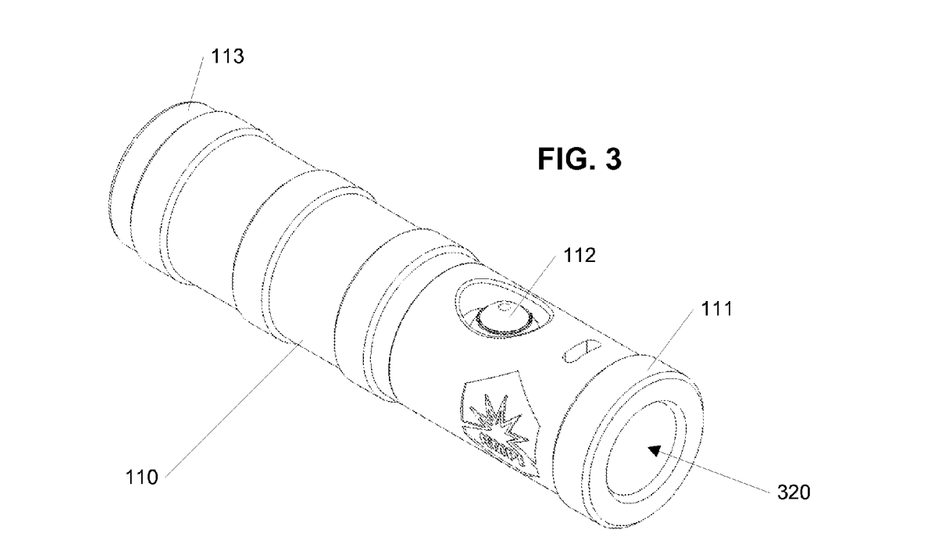
FIG. 3 shows a perspective view of one example of a mounting end of a handle of a breaching tool, detached from a cartridge of the breaching tool.

FIG. 3 shows a perspective view of one example of mounting end 111 of handle 110, detached from cartridge 150. In this example, the handle has dimensions that are suitable for gripping by hand, such as a cylindrical diameter of 1.67 in, and a length of 6.64 in. Other dimensions can also be used, e.g., diameters of 1-2.5 in.; lengths of 3-12 in. Other non-cylindrical geometries can also be used. As shown in the figure, handle 110 has a female receiving structure 320 in mounting end 111. Female receiving structure 320 is configured to receive a corresponding male attachment portion of cartridge 150.

Figures 4, 5:
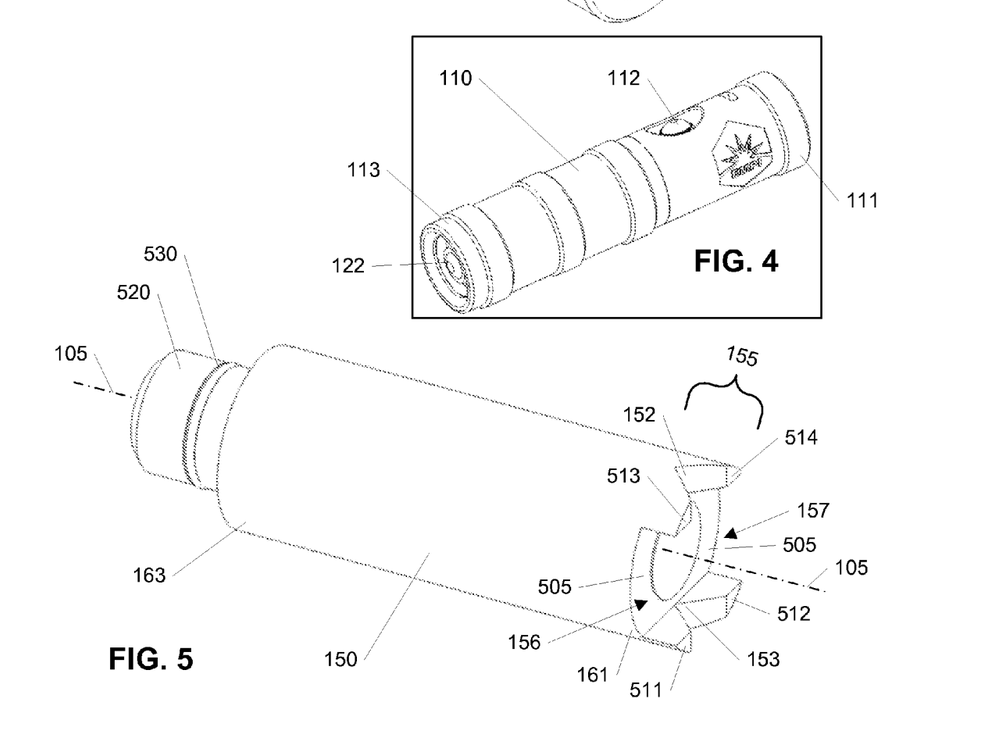
FIG. 4 shows a perspective view of one example of the tail end of a handle.
FIG. 5 shows a perspective view of one example of the firing end of a cartridge.

FIG. 4 shows a perspective view of one example of tail end 113 of handle 110. In this view, a safety button 122 is visible, disposed on tail end 113. In various implementations, safety button 122 must be engaged before firing button 112 can be activated. In one implementation, safety button 122 is an illuminating push-button toggle switch that illuminates when safety button 122 is in an engaged state (indicating that breaching tool 100 is armed), and which de-illuminates when safety button 122 has been disengaged (indicating that breaching tool 100 is disarmed).

FIG. 5 shows a perspective view of one example of firing end 161 of cartridge 150. This view illustrates the four tips of alignment structure 155, which end in four tips 511, 512, 513, and 514. Vee groove 153 is between adjacent tips 511 and 512. Vee groove 152 is between adjacent tips 513 and 514. Exhaust region 156 is between adjacent tips 511 and 513. Exhaust region 157 is between adjacent tips 512 and 514.

In this example, exhaust regions 156 and 157 form a square-cut channel that is perpendicular to body axis 105, and perpendicular to the line between vee grooves 152 and 153. As can be seen from FIG. 2, this channel can be helpful for allowing flame, exhaust, or debris to depart from the interaction between the hot discharge and the target. In the illustrated example, the channel is defined by three planes. One of these planes is a front-surface 505 that is perpendicular to body axis 105, defining part of the edge of firing end 161. A second plane is perpendicular to front-surface 505, forming an inner edge of tips 511, 512. A third plane is parallel to the second plane, forming an inner edge of tips 513, 514. In other implementations, the channel can have other geometries that permit exhaust of combustion products and debris.

Protruding from the mounting end 163 of cartridge 150 is a male structure 520 dimensioned to engage with female structure 320 of handle 110. In this implementation, the structures 320, 520 are configured to removably lock together under manual pressure. An o-ring 530 provides a seal between handle 110 and cartridge 150 when these units 110, 150 are engaged. A user can snap units 110, 150 together in preparation for operation, and can unsnap the units to disengage them or to discard an expended cartridge. In various implementations, structures 320, 520 have cylindrical symmetry that allows handle 110 to be rotated into a desired orientation with respect to cartridge 150. This rotatability can be useful in preparing the firing button for comfortable positioning prior to firing. In various implementations, o-ring 530 or other features provide some friction that prevents undesired rotation between the handle and the cartridge. Such a mounting may be useful, for example in implementations that use a pistol-grip handle geometry (instead of a cylindrical in-line handle body). Similarly, various implementations may use non-cylindrical mountings instead of structures 320, 520.

Figure 6:
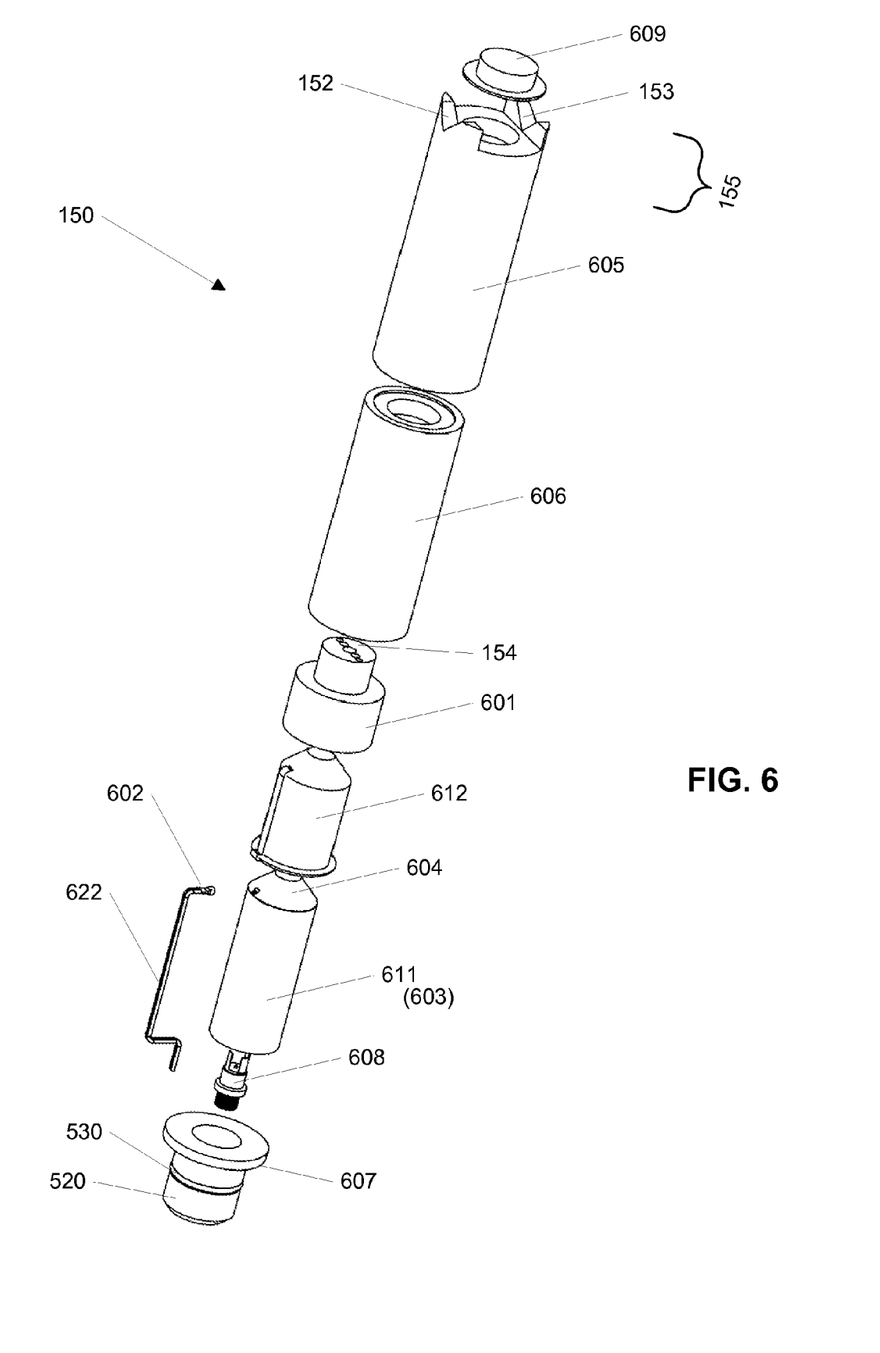
FIG. 6 is an expanded view of one example of a cartridge.

FIG. 6 is an expanded view of one example of cartridge 150. In this example, cartridge 150 includes a nozzle 601, an igniter 602, igniter leads 622, a reactive material (RM) charge 603, ignition powder 604, a shell 605, a liner 606, a rear cap 607, a power connector 608, a nozzle protector 609, o-ring 530, a tube 611, and a powder wrapper 612.

In various implementations, nozzle 601 is formed of graphite or other heat-resistant material. Exit aperture 154 is the firing-end opening of a channel (or channels) that extends longitudinally through nozzle 601.

Igniter 602 is illustrated in this example as an electric match, which creates a high-temperature point when current is supplied to the igniter through igniter leads 622, power connector 608 and other connecting wires and supporting circuitry. In various implementations, an electric match is configured to provide between 50 J and 500 J of thermal energy (e.g., approximately 60 J, 200 J) when supplied with an appropriate current (e.g., approximately 1 A, 2 A, 3 A). Other forms of igniters can be used in different implementations, as discussed below.

In this implementation, RM charge 603 is a packed powder or other compressed material, packed into tube 611. Tube 611 can be made for example, of a thin plastic material, and can serve as a holding container for RM charge prior to assembly of cartridge 150. (In this view RM charge 603 is hidden within the surrounding tube 611.) In various implementations, RM charge 603 can be a sample of 5cc-200cc of combustible material such as a thermite composition. In various implementations, the reactive material includes a metal powder fuel and a metal oxide that can combust in a highly exothermic oxidation-reduction reaction. Examples of the fuel include various elements or alloys or mixtures of Al, Mg, Ti, Zn, Si, B, Zr, Ta, or others, or combinations thereof. Examples of oxidizers include oxides of copper, boron, silicon, chromium, manganese, iron, lead, molybdenum, tungsten, or other oxides, or combinations thereof. In one implementation, the combustible material includes a fuel of an magnesium-aluminum alloy, an oxidizer that includes $CuO$ and $MoO_3$, and a binder material. Examples of combustible materials can be found, for example, in U.S. Pat. No. 7,632,365, issued to D'Arche et al.

In addition to RM charge 603, cartridge 150 includes an additional charge of reactive material powder, depicted as ignition powder 604. In this example ignition powder 604 is disposed in a conical portion adjacent to a firing end of RM charge 603. Ignition powder 604 is loosely-packed reactive material. Because of the comparatively loose packing, ignition powder 604 has a lower energy density but combusts more readily than RM charge 603. In the illustrated implementation, RM charge is too densely packed to respond to igniter 602. Ignition powder 604, however, can be ignited by igniter 602. Once ignited, ignition powder 604 can start the burn of RM charge 603. The combination of electric power, igniter 602, ignition powder 604, and RM charge 603 is an example of an ignition chain. These elements are chosen with respect to each other so that an initial element (electric power, initiated by button 112) can be readily activated, which in turn causes ignition of elements that reliably and controllably produce progressively hotter or more intense combustion (igniter 602, ignition powder 604, RM charge 603).

In various implementations, powder wrapper 612 is a thin latex bag or wrapper. Powder wrapper 612 can serve as a holding container for RM charge 603 (and tube 611), ignition powder 604, and igniter 602 prior to assembly of cartridge 150. Ignition powder 604 is held against RM charge 603 by powder wrapper 612. Similarly, igniter 602 is held within (or against) ignition powder 604 by powder wrapper 612.

Shell 605 serves as a housing body for cartridge 150. In various implementations, shell 605 is formed of steel, stainless steel, other metal, or other durable material. In this example, shell 155 has been formed so that it includes alignment structure 155.

Liner 606 is a thermal insulator between the reactive materials and shell 605. Liner 606 confines the location where RM charge 603 combusts. In various implementations, liner 606 forms a combustion chamber so that the vapor, heat, and combustion products of RM charge 603, ignition powder 604, and igniter 602 are expelled in a jet through exit aperture 154. In various implementations, liner 606 assists in providing a hand-held capability to breaching tool 100. Liner 606 can be formed, for example, of a ceramic such as silicon carbide or an epoxy with flame retardant materials. As discussed below, various implementations of liner 606 are constructed solely from a moldable material or from a combination of prefabricated and moldable material. In other implementations, the liners are prefabricated or have a non-molded construction.

In implementations where igniter 602 is an electric match, power connector 608 is connected to igniter leads 622. Power connector 608 serves as an electrical port through which current can be supplied to igniter 602 in order to initiate combustion.

Rear cap 607 connects to shell 605 and holds power connector 608. In various implementations, rear cap 607 is adapted for making a friction-fit detachable connection to handle 110. Accordingly, the depicted example includes male structure 520 and has a ridge for o-ring 530. On the other end of cartridge 150, nozzle protector 609 serves as a cover that prevents debris from entering the exit aperture. In various implementations, nozzle protector 609 is formed of a plastic material that can quickly melt or vaporize, so that exit aperture is quickly opened once ignition has started.

Figures 7, 8, 9, 10:
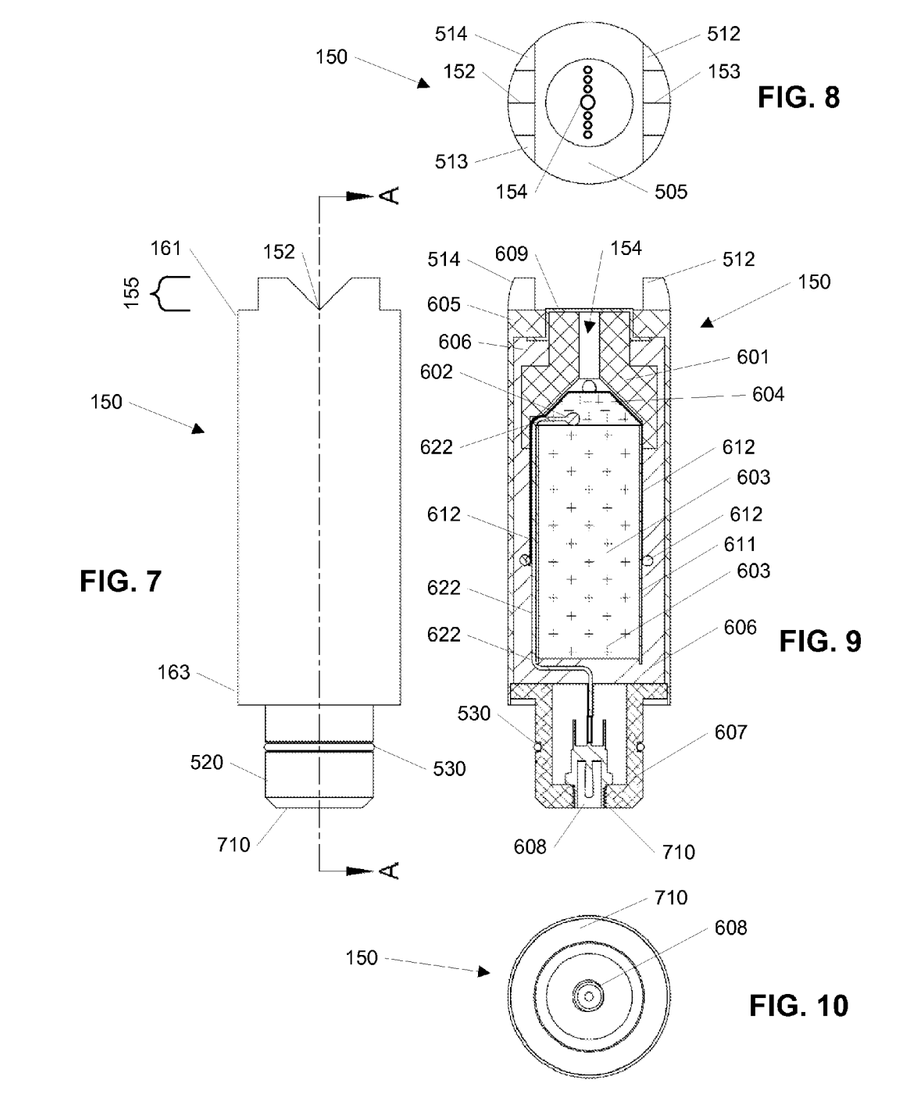
FIG. 7 illustrates a side view of one example of a cartridge.
FIG. 8 illustrates a front view of one example of a cartridge.
FIG. 9 illustrates a cutaway view of one example of a cartridge.
FIG. 10 illustrates a rear view of one example of a cartridge.

FIGS. 7, 8, 9, and 10 respectively illustrate a side view, a front view, a cutaway view, and a rear view of one example of cartridge 150. The side view in FIG. 7 shows firing end 161 (or front) and mounting end 163 (or rear) of cartridge 150. Vee groove 152 is visible in this view, as well as a rear surface 710 at the opposite end of cartridge 150.

The front view in FIG. 8 shows vee grooves 152, 153 and prong tips 511, 512, 513, 514 in alignment structure 155. FIG. 8 also shows front-surface 505 between the tips of alignment structure 155. FIG. 8 additionally shows exit aperture 154 as it would appear behind nozzle protector 609. In this example, exit aperture 154 includes a linear arrangement of side-by-side round holes formed into front-surface 505. The exit aperture is centered both along and across a line (not shown) between vee grooves 152, 153 (the target axis, which represents a rod or bar for cutting). The rear view in FIG. 10 shows power connector 608 and rear surface 710.

The cutaway in FIG. 9 depicts the assembled arrangement of components from FIG. 6. The transect plane for this view is illustrated as line A-A in FIG. 7. Shell 605 serves as a housing for the other components. Tips 512 and 514 are visible in this cutaway view, at the firing end 161 of cartridge 150. The firing end of nozzle 601 is covered by nozzle protector 609. The other side of nozzle 601 has a conical indentation that communicates with exit aperture 154. Ignition powder 604 is held within this conical indentation. Also shown is powder wrapper 612, which holds ignition powder 604 to RM charge 603. Powder wrapper 612 may be formed of a pliable material that can conform to the conical surface in nozzle 601.

Igniter 602 is also shown in FIG. 9, inserted into ignition powder 604 and adjacent to RM charge 603. Igniter leads 622 extend from igniter 602, along the side of RM charge 603, out from a rear opening in powder wrapper 612, to connect with power connector 608 at the mounting end 163 of cartridge 150.

In other implementations, instead of an electric igniter, the igniter is a shock tube (e.g., Nonel™) or fuse or other form of igniter that is activated by corresponding elements in a handle. Such igniters may extend from a connector point at the rear of the cartridge, around a main charge, to an ignition powder, for example, along a path substantially within the liner, such as illustrated by igniter leads 622 in FIG. 9. Alternatively an initiating end of a shock tube can extend out of a shell of the cartridge (in implementations where the cartridge does not need to be waterproof or otherwise sealed or protected).

Another form of igniter that can be used in some implementations is a percussion primer at the rear of the cartridge, located within shell 605, with a shock tube or fuse that extends to the ignition powder. In one example of such an implementation, the ignition chain involves a signal flow from an initial mechanical element (e.g., a spring-loaded firing pin), to a percussion primer, through a shock tube, to a pyrogen, into loose powder, and then to packed powder.

Liner 606 forms a cylindrical wall around RM charge 603 (and tube 611), ignition powder 604 (and igniter 602 and powder wrapper 612), and a rear portion of nozzle 601. Igniter leads 622 are also partly enclosed in liner 606. Liner 606 also forms a rear wall against RM charge 603, near the mounting end of cartridge 150; igniter leads 622 extend through the rear wall and connect to power connector 608 in rear cap 607.

As illustrated in this example, RM charge 603 and ignition powder 604 are in contact with each other and encased around their non-axial surfaces by liner 606. The rear wall of liner 606 also encases the rear surface of RM charge 603. The front surface of ignition powder 604 is partly confined by the conical indentation in nozzle 601, and is partly adjacent to exit aperture 154.

In various implementations, liner 606 is constructed of a moldable powder, liquid, paste, or other material that can be initially poured or placed around RM charge 603, ignition powder 604, igniter 602, and one end of nozzle 601. The moldable material then hardens into a solid form that defines a combustion chamber and protects other components from the combustion of reactive material.

In various implementations, liner 606 is formed during assembly of cartridge 150. RM charge 603 (within tube 611) is aligned in shell 605, along with other components such as ignition powder 604, igniter 602, powder wrapper 612, and nozzle 601. The alignment is made such that a cylindrical gap is present between the outer surface of tube 611 and the inner surface of shell 605. The material for liner 606 (e.g., ceramic or epoxy) is poured or otherwise placed into this gap. The material is then baked, cured, or otherwise hardened to create the finished liner 606. In various situations, this process produces a liner that tightly confines combustion for the reactive material. With appropriate care in the baking or curing, a liner can be made that is adequate to avoid leakage of flame, excessive heat, or other reaction products into other portions of breaching tool 100, and can protect a user who uses breaching tool 100 as a hand-held device.

In various implementations, the components of cartridge 150 can be assembled using bonds, gaskets, seals, adhesives, or other components that serve to make cartridge 150 watertight. In some implementations, cartridge 150 is submersible, and may be suitable for underwater operation.

Figure 11:
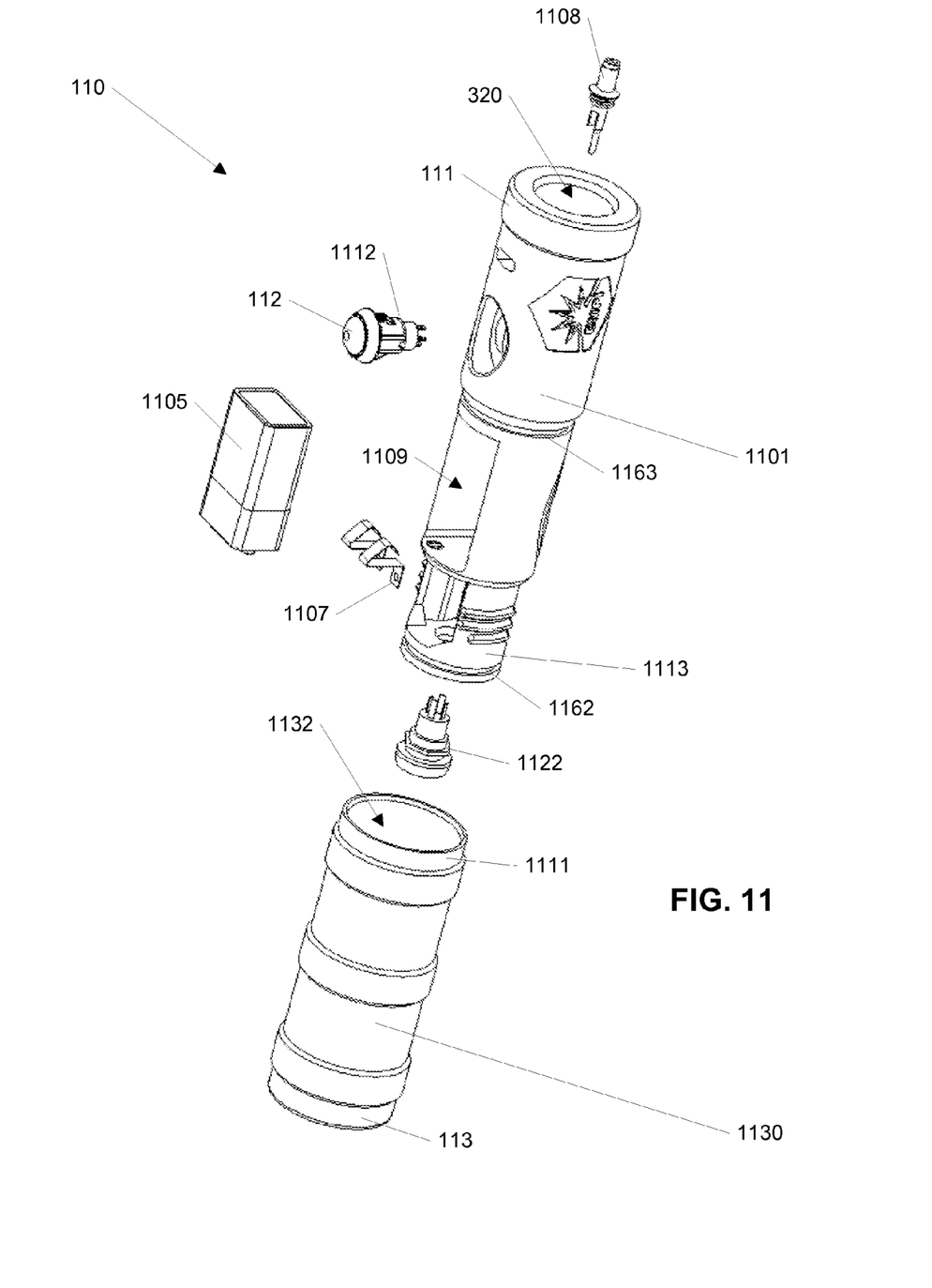
FIG. 11 is an expanded view of one example of a handle.

FIG. 11 is an expanded view of one example of handle 110. In this example, handle 110 includes a chassis 1101, a cover 1130, an activating switch unit 1112, a handle-side power connector 1108, a battery contact 1107, a battery 1105, and a safety switch unit 1122. Activating switch unit 1112 includes firing button 112. When assembled, handle 110 has electrical connectivity that supplies electrical voltage from battery 1105 through battery contact 1107, through switch units 1112 and 1122 (when engaged), through handle-side power connector 1108, and through a cartridge-side power connector (e.g., power connector 608 from FIG. 6) to an igniter.

One end of chassis 1101 is mounting end 111 of handle 110. The opposite end of chassis 1101 is a tail end 1113. One end of cover 1130 is tail end 113 of handle 110. The opposite end of cover 1130 is a receiving end 1111. Tail end 1113 of chassis 1101 is dimensioned to fit into an opening 1132 in receiving end 1111 of cover 1130. Ridges 1162 and 1163 on chassis 1101 and complimentary ridges in cover 1130 (not shown) enable a friction fit between cover 1130 and chassis 1101. As an alternative to a friction-fit ridges, or in combination, other implementations of cover 1130 and chassis 1101 can be engaged using screw threading, gaskets, or other connection components.

Chassis 1101 has a battery compartment 1109 into which battery contact 1107 can be fit and battery 1105 can be inserted, and receiving sections for handle-side power connector 1108 and activating switch unit 1112. Safety switch unit 1122 includes safety button 122 (shown in FIG. 4) and fits into a receiving section on a rear face of chassis 1101.

In various implementations, the components of handle 110 can be assembled using bonds, gaskets, seals, adhesives, or other components that serve to make cartridge 150 watertight. In some implementations, handle 110 is submersible, and may be suitable for underwater operation.

Figure 12:
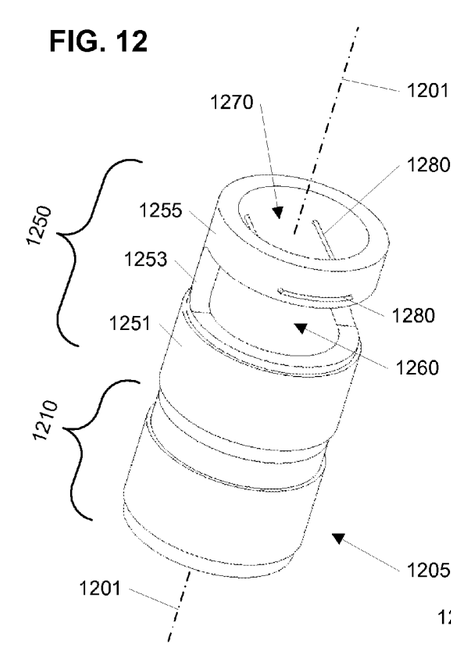
FIGS. 12 and 13 show an attachment clip for a cartridge.
Figure 13:
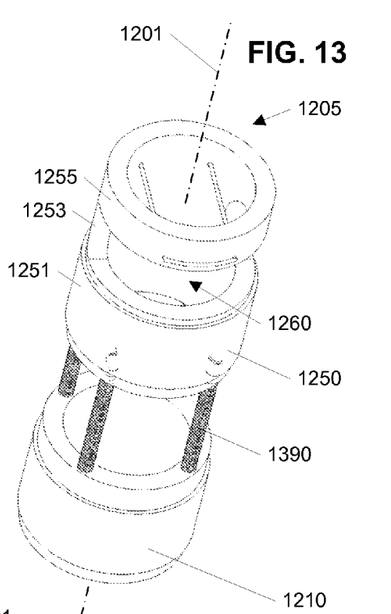

FIGS. 12 and 13 show an attachment clip 1205 for a breaching-tool cartridge. In various implementations, attachment clip 1205 can be used to affix a cartridge, e.g. cartridge 150, to a target object. Accordingly, attachment clip 1205 can be used to enable hands-free operation of the breaching-tool cartridge.

Attachment clip 1205 includes a base portion 1210 and a retracting portion 1250. Base portion 1210 is configured to grip the nozzle end of a breaching-tool cartridge. In the example of FIGS. 12 and 13, these portions 1210, 1250 each have a roughly cylindrical body along a body axis 1201, and have a cylindrical void 1270 within. Void 1270 is also centered on body axis 1201, and has an inner geometry (e.g., an inner diameter) that is configured to receive the breaching-tool cartridge.

In the example of FIG. 13, attachment clip 1205 is in an "open" configuration, with portions 1210, 1250 separated from each other along body axis 1201. In this example, four springs 1390 extend from base portion 1210 to retracting portion 1250. Springs 1390 are aligned parallel to body axis 1201, and are evenly spaced around the axis. Springs 1390 are nested in corresponding slider holes (obscured in FIG. 13) in retracting portion 1250 and base portion 1210. Within the slider holes are rigid circular wire anchors that hold the springs to their respective portions 1210 and 1250.

The springs are biased to retract retracting portion 1250 toward base portion 1210 along body axis 1201. Unless the portions 1210, 1250 are pulled apart, the spring mounts hold them in a stable "closed" configuration, with base portion 1210 adjacent or substantially adjacent to retracting portion 1250, as shown in the example of FIG. 12.

Retracting portion 1250 includes a slot 1260 dimensioned for receiving a target object, such as a section of a rebar or lock shackle, or an edge of a hinge, or other cylindrical, rod-shaped, or edged target, for example. As illustrated, retracting portion 1250 has a base-side portion 1251, a distal portion 1255, and a connecting portion 1253. Slot 1260 is defined by edges of these portions 1251, 1253, 1255. In various implementations, the exterior cylindrical surfaces of portions 1210 or 1250 or both can be partly or fully covered with a frictional material that facilitates quick hand-held operation to pull apart portions 1210 or 1250. In various implementations, these surfaces can be partly or fully covered with attachment material, such as one or both types of a complimentary hook-and-loop fabric (e.g., Velcro™) that allows attachment to a user's belt, harness, jacket, or other garment with complementary attachment material.

Figure 14:
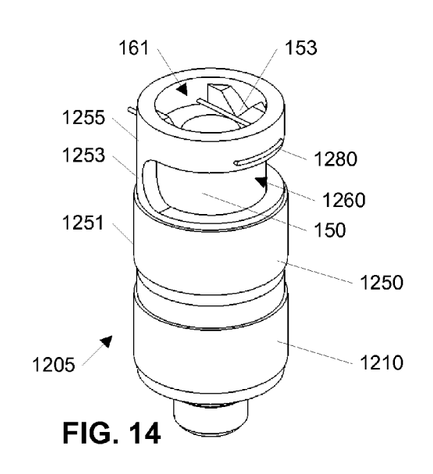
FIGS. 14 and 15 show an attachment clip mounted on a cartridge.
Figure 15:
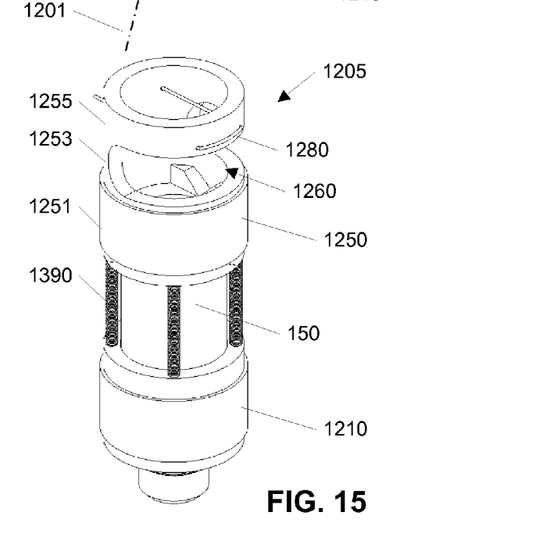

FIGS. 14 and 15 show attachment clip 1205 mounted on cartridge 150. In FIG. 14, attachment clip 1205 is in the closed configuration. In FIG. 15, attachment clip 1205 is in the open configuration.

Base portion 1210 is attached to cartridge 150 using a friction fit, e.g., with appropriate dimensioning or gaskets or pliable materials. In other implementations, a cartridge can be attached to the cartridge-side gripping portion using screw threads, twist-lock tabs, spring-loaded clips, or other structures.

With attachment clip 1205 in the closed configuration, firing end 161 of cartridge 150 extends into slot 1260, as shown in FIG. 14. An alignment tool 1280 can be used to hold cartridge 150 at a desired orientation with respect to attachment clip 1205. In the illustrated example, alignment tool 1280 is a double-bent wire inserted into guide holes in distal portion 1255. This double-bent wire fits into the square-cut channel on cartridge 150, between vee grooves 152 and 153 along exhaust regions 156 and 157. In preparation for operation, this double-bent wire keeps cartridge 150 rotated at a desired orientation with respect to slot 1260: a target rod pressed into slot 1260 will be substantially aligned along the target axis defined by alignment structure 155 of the cartridge.

When attachment clip 1205 is pulled into the open configuration, firing end 161 is partly or completely withdrawn out of slot 1260, as shown in FIG. 15. With attachment clip 1205 in the open position, a target structure (e.g., a metal rod) can be inserted into slot 1260. When attachment clip 1205 is released into the closed configuration, retracting portion 1250 is pressed by its spring mounting toward base portion 1210. With this spring-loaded pressure, the target structure is clamped, in slot 1260, between distal portion 1255 and the firing end of cartridge 150.

With the target structure thus clamped in slot 1260, attachment clip 1205 and cartridge 150 are stably attached to the target structure; a user can let go of attachment clip 1205 and cartridge 150 and retreat to a stand-off location in preparation for operation of the breaching tool. Such stand-off operation may be desired in situations where the breaching operation is an unsafe location, or is an inconvenient location (e.g. underwater), or is one of several locations where simultaneous breaching is desired.

Figure 16:
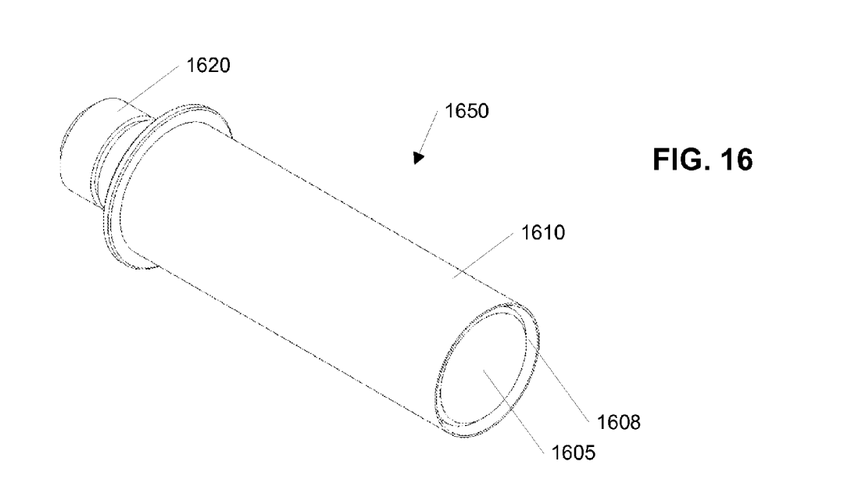
FIG. 16 shows an extension cable spool.
Figure 17:
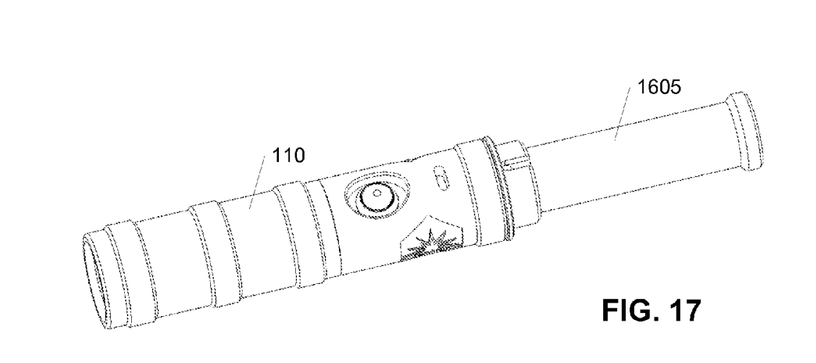
FIG. 17 shows an extension cable spool mounted on a firing handle.

FIGS. 16 and 17 show an extension cable spool 1650. In various situations, extension cable spool 1650 can be used for stand-off operations where it may be helpful for an operator to be at more than arm's-length distance from the breaching target. FIG. 16 shows an example of cable spool 1650, including a mounting portion 1620 that is configured to attach to handle 110, a mandrel 1605 around which extension wire can be wrapped, and a removable cover sleeve 1610 configured to protect wire wrapped around the mandrel. An annular region 1608 between mandrel 1605 and cover sleeve 1610 is dimensioned to hold an appropriate amount of wrapped wire (not shown), such as 2, 4, 10, or 20 meters or more in length. In various implementations, cable spool 1650 can be configured to allow a user to rapidly deploy wire by pulling an end of the wire outward from the annular region. In various implementations, cover sleeve 1610 is a lightweight flexible material and is easily detached from mounting portion 1620 and mandrel 1605.

In FIG. 17, mounting portion 1620 has been attached to receiving structure 320 of handle 110 (from FIG. 11), and cover sleeve 1610 has been removed. Extension cable spool 1650 can include an extension wire (not shown) that is connected through mandrel 1605 to a contact (not shown) that engages electrically with handle-side power connector 1108 (from FIG. 11).

Extension cable spool 1650 and attachment clip 1205 can be used together with a cartridge 150 to enable hands-free or stand-off breaching operations. A user can connect the wire from the extension cable spool to a cartridge using an electrical connector (not shown), connect the attachment clip to the cartridge, affix the cartridge to a target using the attachment clip; move away to a standoff location while unspooling wire, and remotely initiate operation of the cartridge through the unspooled wire.

In various situations, a splitter can be used to support the simultaneous firing of multiple breaching-tool cartridges. The splitter includes a source-end connector that is configured to attach to a power supply, and a set of wire pairs that connect at one end to the source-end connector. The other end of each wire pair is connected to a respective cartridge-end connector.

In one example, a splitter includes a source-end connector that has a structure similar to the male structure 520 of cartridge 150. This geometry allows the source-end connector to be inserted into a power supply such as handle 110. The source-end connector in this example is coupled by four wire pairs to four respective cartridge-end connectors, each of which has a structure similar to receiving structure 320 of handle 110. This geometry allows the cartridge-end connectors to receive respective breaching-tool cartridges (and/or one or more cable spools).

In other examples, a splitter can include other numbers of cartridge-end connectors, such as 6, 10, 12, or more cartridge-end connectors, and appropriate wiring. In various implementations, a splitter can include a power supply adapted for the increased load of multiple cartridges, and may be operated without being attached to a handle 110. For example, the power supply may include one or more batteries, charge-capacitor sources, or combinations thereof. Fail-safe circuitry can also be included to ensure all-or-none operation for some or all of the cartridges. Alternatively, or in addition, the circuitry can be designed to allow independent operation for some or all of the cartridges. Pre-fire testing circuitry (e.g., a low-voltage continuity check) can also be included in various power sources.

Figure 18:
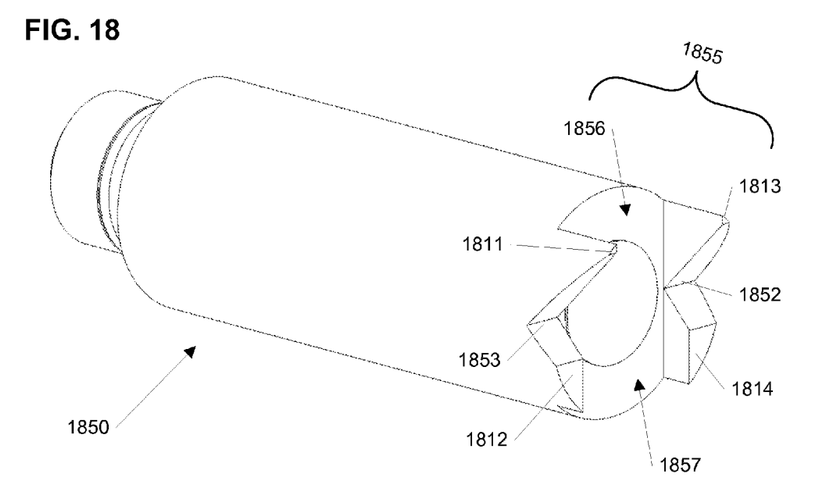
FIG. 18 shows an example of a cartridge with an angled alignment structure.
Figure 19:
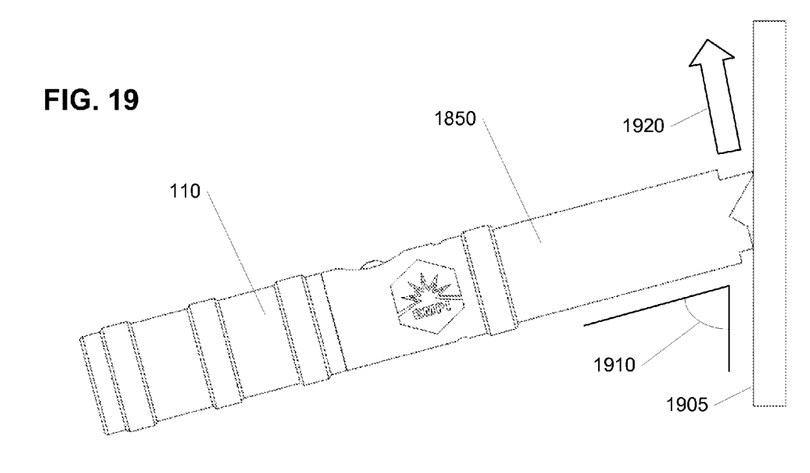
FIG. 19 shows an example of a cartridge with an angled alignment structure, mounted in a firing handle and in alignment with a planar surface.

FIGS. 18 and 19 show an example of an expendable cartridge 1850 with an angled alignment structure 1855. As shown in FIG. 18, alignment structure 1855 has four tips 1811, 1812, 1813, and 1814, vee grooves 1853 and 1852, and exhaust regions 1856 and 1857, which are similar to tips 511, 512, 513, and 514, and vee grooves 553 and 552, and exhaust regions 156 and 157, respectively, from FIG. 5.

As shown in FIG. 18, however, tips 1811 and 1813 are longer than tips 1812 and 1814. The result of this geometry is visible in FIG. 19: when cartridge 1850 is held so that tips 1811, 1812, 1813, and 1814 are pressed against a flat or substantially flat target 1905, the body of cartridge 1850 makes an angle 1910 of less than ninety degrees with the target surface. During operation, molten or vaporized target material and other debris can be ejected through exhaust region 1856 in a direction 1920. Because of the angle 1910, the force of the discharge from cartridge 1850 can be helpful in expelling material in direction 1920, away from the target region that is being breached. Expelling the material in this manner can help avoid pooling of melted target, which could otherwise interfere with the breaching process. In various implementations, angle 1910 is approximately 45, 50, 60, 65, 70, 75, or 80 degrees.

In view of the various implementations, examples, alternatives, and illustrations presented in this description and in the drawings, a skilled person will readily recognize that a variety of embodiments are possible for the present invention.

In one example, a system includes a reactive material, a nozzle, a liner, and an igniter. The nozzle includes at least one exit aperture and is configured to direct a discharge produced by combustion of the reactive material. The liner is disposed around the reactive material and connected to the nozzle. The liner is configured to confine the discharge to the at least one exit aperture. The igniter is disposed within the liner and in contact with the reactive material.

In various embodiments, the reactive material includes two or more portions, one portion that is ignitable by the igniter, and another portion that is not ignitable by the igniter but is ignitable by an adjacent other portion of the reactive material.

In various embodiments, the liner is suitable to protect a user's hand (e.g. a bare hand or a gloved hand approximately 5", 8", 10", or 12" from the exit aperture) during hand-held operation of the system. In various embodiments, the liner can be formed during assembly of a disposable-cartridge portion of the system. In various embodiments, the liner is formed by pouring a base material, such as a ceramic or epoxy material, into a form around the reactive material, and allowing the base material to harden into the protective liner.

In various embodiments, a breaching tool includes an alignment structure that defines a target spot, a target axis, or a target plane. The alignment structure includes elements that allow a user to stably hold the breaching tool in an effective alignment against a target.

In various embodiments, a breaching tool includes a handle. The handle can be detachably connected to a housing of an expendable cartridge that houses the reactive material. The handle can be configured to activate the igniter, for example with the press of an ignition button mounted on the handle. In various embodiments, the handle and cartridge form a self-contained hand-held breaching tool. The weight, nozzleing, reaction force, or sound level, or combinations thereof, of the breaching tool during operation may be suitable for hand-held operations. In various implementations, the size and weight of a breaching tool approximately match those of a hand-held flashlight. In various embodiments, the discharge produced by combustion of the reactive material exerts a small reaction force that is suitable for hand-held operation, e.g., 4 lbs, 5 lbs, 10 lbs of reaction force. In various embodiments, the discharge is produced with a suitable amount of sound, e.g., less than 50 dB, 80 dB, 100 dB, 120 dB of sound at locations more than 5, 10, or 15 feet from the exit aperture(s).

In another example, a system includes a reactive material block, a nozzle, a cover unit, and a liner. The nozzle is configured to direct a discharge produced by combustion of the reactive material. The nozzle has a discharge end, a combustion end, and an aperture that runs through the nozzle from the discharge end to the combustion end. The cover unit is connected to the combustion end of the nozzle. A liner volume is partly defined between an inner surface of the cover unit, an outer surface of the reactive material block, and a combustion end of the nozzle. The liner is formed in the liner volume.

In various embodiments, the liner is formed by pouring or pressing a material (e.g., a liquid or powder mixture of metal, ceramic, or epoxy material) into the liner volume and allowing the material to harden. In various embodiments, the liner is sealingly attached to the inner surface of the cover unit, the outer surface of the reactive material block, and the combustion end of the nozzle. In various embodiments, the liner is configured to confine a discharge of the reactive material block to the aperture through the nozzle. In various embodiments, the liner is configured to protect a user during hand-held operation of the system as a thermal breaching tool. For example, the liner may be configured in thermal conductivity, thickness, strength, sealing quality, and/or other characteristics ensure that none of the hot discharge is leaked through the liner but is confined to exit through the nozzle. Similarly, the liner may be configured in various characteristics to ensure that an outer-surface temperature of the liner or a surrounding shell does not exceed a suitable temperature, such as 30, 35, 40, 45, 50 degrees Celsius.

In various embodiments, the system includes an igniter disposed within the liner and in contact with the reactive material. In various implementations, the igniter is an electric match or a shock-tube end that is housed within the liner for self-contained storage and operation.

In a further example, a system includes an igniter, a first portion of reactive material that is not reliably ignitable by the igniter, a second portion of reactive material that is reliably ignitable by the igniter, and a nozzle. The second portion of reactive material is in contact with the first portion and with the igniter. The nozzle is configured to direct a discharge produced by combustion of the reactive material, and includes at least one exit aperture.

In various embodiments, the first portion of reactive material includes a compacted powder and the second portion of reactive material includes a loose powder, which may be the same chemical composition as the compacted powder.

In various embodiments, the system includes a low-power and low-energy electrical source, such as one or more batteries and/or one or more charge capacitors, and the igniter is an electric match that can be activated by the electrical source to produce a thermal output suitable to ignite the second portion of reactive material.

In one example, a method for assembling a breaching tool includes aligning an igniter between a reactive material and a nozzle, and sealing the reactive material to the nozzle.

The sealing can include, in various embodiments, molding a liner around the reactive material. In various embodiments, the method includes aligning a shell around the reactive material prior to the sealing, and pouring liner material into a molding cavity between the reactive material and the shell. In various embodiments, the liner is cured, cooled, or otherwise processed to form a rigid structure suitable to confine combustion of the reactive material to exit through the nozzle. In various embodiments, the igniter, reactive material, liner, and shell form an expendable cartridge. In various embodiments, the method includes affixing the cartridge to a handle portion. In various embodiments, the handle portion includes elements configured to activate the igniter.

In one example, a method for operating a breaching tool includes aligning one or more exit apertures of the breaching tool with a target, and activating an internal igniter in the breaching tool. In various embodiments, the activating includes a pushbutton operation on a handle of the breaching tool. In various embodiments, the method includes handheld operation of the breaching tool. In various embodiments, the method includes affixing an attachment clip to the breaching tool and applying the attachment clip to a target prior to activating the internal igniter. In various embodiments, the method includes applying multiple breaching tools to a plurality of target points prior to activating internal igniters in each of the breaching tools. In various embodiments, the method includes simultaneous activation of internal igniters in each of the breaching tools.

Although the present disclosure has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present disclosure without departing from the spirit and scope of the disclosure as defined by the appended claims.

What is claimed is:
1. A system comprising:
a reactive material;
a nozzle configured to direct a discharge produced by combustion of the reactive material, wherein the nozzle comprises at least one exit aperture;

a liner disposed around the reactive material and connected to the nozzle, wherein the liner is configured to confine the discharge to the at least one exit aperture;

an igniter disposed within the liner and in contact with the reactive material;

a cartridge housing disposed around the liner; and a reusable handle, wherein the handle is detachably connected to the cartridge housing only at a location substantially distal from the at least one exit aperture.

2. The system of claim 1, wherein:

the reactive material comprises a first portion that is not highly sensitive to the igniter, and a second portion that is highly sensitive to the igniter, and that is in contact with the igniter and with the first portion.

3. The system of claim 1, wherein the liner is configured to protect a user during hand-held operation of the system.

4. The system of claim 1, wherein the liner is formed by being poured and molded in a space defined at least in part by (a) an outer surface of the reactive material, (b) a surface of the nozzle, and (c) a shell disposed around the reactive material.

5. The system of claim 4, further comprising the shell.

6. The system of claim 1, wherein the at least one exit aperture comprises a plurality of holes arranged in a linear pattern.

7. The system of claim 1, wherein the at least one exit aperture consists of a single substantially round hole through the nozzle and the liner, and wherein the liner is formed of a ceramic material.

8. The system of claim 1, comprising:

an alignment structure, mechanically coupled to the nozzle and configured to stably align the nozzle with respect to a target.

9. A system comprising:

a reactive material;

a nozzle configured to direct a discharge produced by combustion of the reactive material, wherein the nozzle comprises at least one exit aperture;

a liner disposed around the reactive material and connected to the nozzle, wherein the liner is configured to confine the discharge to the at least one exit aperture;

an igniter disposed within the liner and in contact with the reactive material; and an alignment structure, mechanically coupled to the nozzle and configured to stably align the nozzle with respect to a target, wherein the alignment structure comprises a pair of notches aligned along a target axis, wherein the target axis is substantially perpendicular to a discharge path from the at least one exit aperture, wherein the at least one exit aperture is oriented to direct the discharge in jet substantially centered between the pair of notches, wherein the at least one exit aperture comprises a plurality of substantially round holes arranged in a linear pattern, and wherein the target axis is substantially perpendicular to the linear pattern.

10. A system comprising:

a reactive material;

a nozzle configured to direct a discharge produced by combustion of the reactive material, wherein the nozzle comprises at least one exit aperture;

a liner disposed around the reactive material and connected to the nozzle, wherein the liner is configured to confine the discharge to the at least one exit aperture;

an igniter disposed within the liner and in contact with the reactive material; and an alignment structure, mechanically coupled to the nozzle and configured to stably align the nozzle with respect to a target, wherein the alignment structure comprises at least three coplanar tips, wherein the tips define a target plane, and the target plane is not normal to a discharge path from the at least one exit aperture.

11. The system of claim 10, wherein the alignment structure is configured such that the discharge path from the at least one exit aperture has an angle in the range of 50-80 degrees from the target plane.

12. The system of claim 1, wherein:

the handle is configured to activate the igniter.

13. The system of claim 1, wherein the system is configured so that the discharge produced by combustion of the reactive material exerts less than 5 lbs of reaction force.

14. The system of claim 1, wherein the system is configured so that the discharge is produced with less than 100 db of sound at locations more than 15 feet from the at least one exit aperture.

15. The system of claim 1, wherein the igniter comprises one or more of: an electric match or a shock tube.

16. The system of claim 1, comprising:

a reusable attachment clip, wherein the attachment clip is detachably connected to the cartridge housing at a location substantially proximate to the at least one exit aperture, and wherein the attachment clip comprises a spring-loaded mechanism configured to detachably connect the attachment clip to a target, and configured to stably hold the nozzle at a fixed orientation with respect to the target.

17. The system of claim 1, wherein:

a first portion of reactive material comprises a compacted powder; and a second portion of reactive material comprises a loose powder.

18. The system of claim 17, wherein:

the first portion of reactive material comprises the same chemical composition as the second portion of reactive material.

19. The system of claim 1, comprising:

a low-power and low-energy electrical source, wherein the igniter comprises an electric match activatable by the electrical source to produce a 1-Watt thermal output.

20. The system of claim 1, comprising:

a low-power and low-energy thermal source coupled to a tube or filament, wherein the igniter comprises a reactive composition located at a distal end of the tube or filament from the thermal source, wherein the tube or filament comprises a reactive material.

21. The system of claim 1, comprising an alignment structure, mechanically coupled to the nozzle and configured to stably align the nozzle with respect to a target, wherein the alignment structure comprises at least three coplanar tips, wherein the tips define a target plane, and the target plane is not normal to a discharge path from the at least one exit aperture.

22. The system of claim 21, wherein the alignment structure is configured such that the discharge path from the at least one exit aperture has an angle in the range of 50-80 degrees from the target plane.

23. The system of claim 9, comprising:

a reusable attachment clip, wherein the attachment clip is detachably connected to the alignment structure, and wherein the attachment clip comprises a spring-loaded mechanism configured to detachably connect the attachment clip to the target, and configured to stably hold the nozzle at a fixed orientation with respect to the target.

24. The system of claim 10, comprising:
a reusable attachment clip, wherein the attachment clip is detachably connected to the alignment structure, and wherein the attachment clip comprises
a spring-loaded mechanism configured to detachably connect the attachment clip to the target, and configured to stably hold the nozzle at a fixed orientation with respect to the target.

* * * * *